W. A. NEWTON,
Wire-Fence Builder.

2 Sheets—Sheet 1.

No. 9,120.

Reissued Mar. 16, 1880.

Witnesses:
A. M. Bright.
F. O. McCleary.

Inventor
Wm A. Newton,
Per H. A. Seymour, Attorney

W. A. NEWTON,
Wire-Fence Builder.

No. 9,120. Reissued Mar. 16, 1880.

Witnesses:
A. M. Bright.
F. O. McCleary.

Inventor
Wm A. Newton.
Per H. A. Seymour, Attorney

UNITED STATES PATENT OFFICE.

WILLIAM A. NEWTON, OF PAPPINVILLE, MISSOURI.

WIRE-FENCE BUILDER.

SPECIFICATION forming part of Reissued Letters Patent No. 9,120, dated March 16, 1880.

Original No. 188,066, dated March 6, 1877. Application for reissue filed August 1, 1879.

DIVISION B.

*To all whom it may concern:*

Be it known that I, WILLIAM A. NEWTON, of Pappinville, in the county of Bates and State of Missouri, have invented a new and Improved Wire-Fence Builder, of which the following is a specification.

My invention relates to a wire-fence builder, and is more especially intended to provide means for applying the wires to the posts after the latter have been driven in position by a post-driver, which constitutes the subject-matter of Division A of this reissue.

The invention consists, first, in providing a base-frame supported on a wagon with horizontally-inclined bars, which extend longitudinally thereof, and journaling wire-spools on said inclined bars, whereby the machine is adapted to be used for laying the wires; second, in providing said portable base-frame with a drum-shaft and connecting the rope of the latter with a wire-clamp, whereby the machine is adapted to be used for straining the wires; third, in providing a hook and pulley for holding the wire while being strained and secured; fourth, in combining with the foregoing a pair of pliers for twisting the wire in joining or splicing it, one jaw of the pliers having an eye and the other jaw having inclined grooves; fifth, in providing an improved device for straining a slack or broken section of wire.

Figure 1:
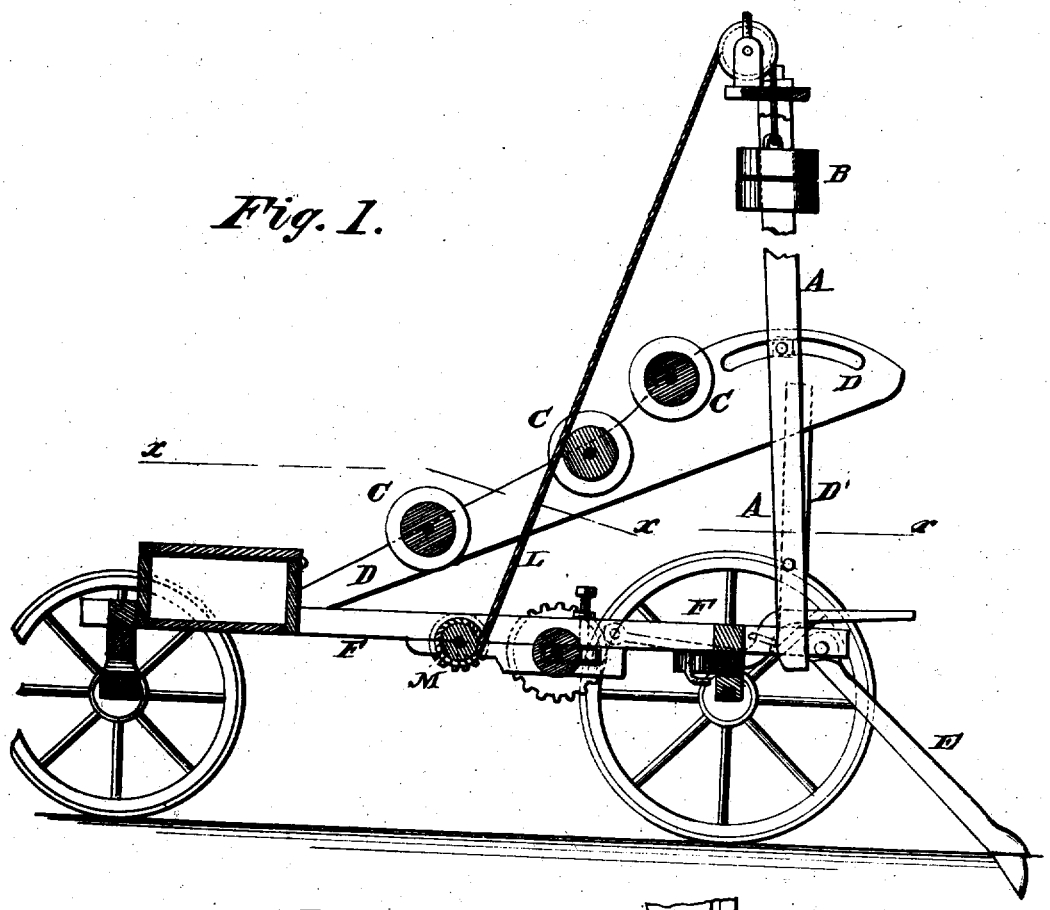
Figure 2:
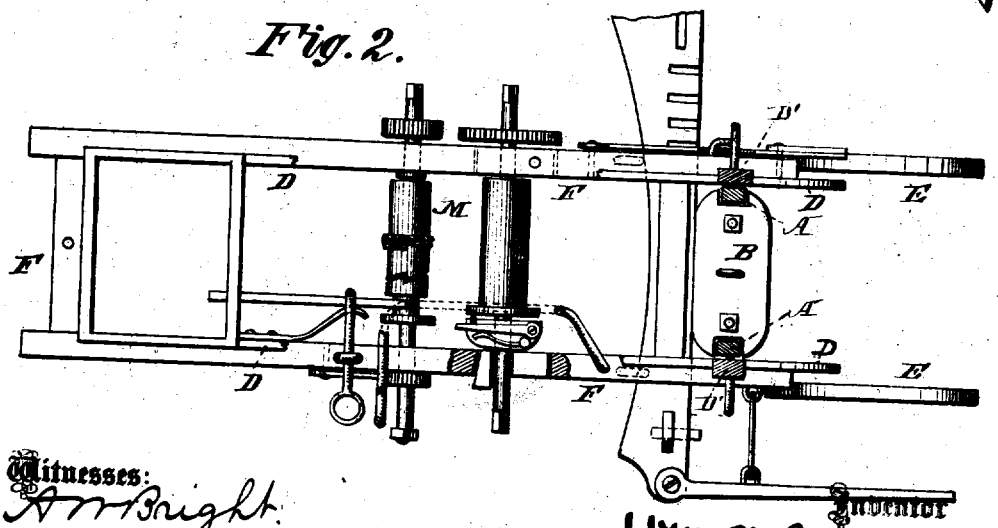
Figure 3:
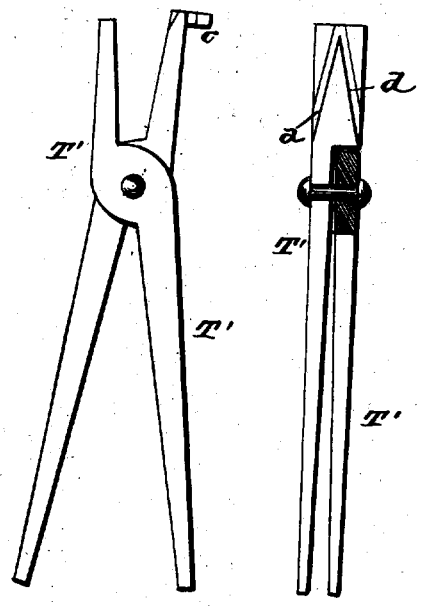
Figure 4:
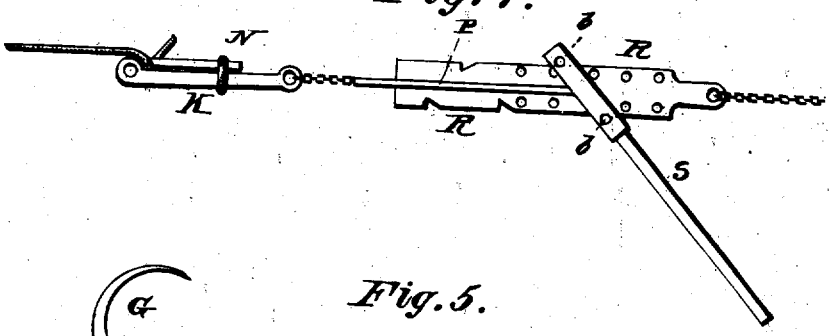
Figure 5:
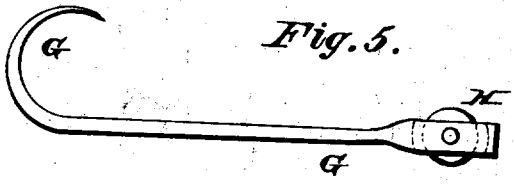

Referring to the drawings, Figure 1 is a side view of my machine, partly in section to show the construction. Fig. 2 is a plan view of the same, partly in section, through the line *x x x* of the preceding view. Fig. 3 represents, in two views, the device for twisting together the ends of two wires. Fig. 4 is a view of the device for tightening a slack or broken wire. Fig. 5 is a view of the device for holding the wire in place while being strained and secured to a post.

The construction and operation of the machine, so far as the same relates to driving the fence-posts, are fully described and claimed in Division A of this reissue, and therefore I confine the following description to the devices which constitute the subject-matter of this Division B of the reissue.

In using the machine for applying wires to fence-posts, the standards A and hammer B are detached, the spools C, filled with wire, are placed in the notches of the bars D, and the stay-braces E are attached to the base-frame F. It will be observed that the lower extremities of the horizontally-inclined bars D are secured to the forward portion of the base-frame, and their upper extremities are secured to the rear uprights, D′.

The machine is driven to the first post of the fence and the ends of the wires attached to said post at the proper distance apart. The machine is then drawn along the line of posts for the distance required for a section.

The device represented in Fig. 5 of the drawings, and which consists of a hooked bar, G, whose shank is provided with a pulley, H, said hooked bar being adapted to be attached to a fence-post in such a position that the pulley H may support the wire at the proper height, and the wire is placed upon the said pulley. The wire is then secured in the clamp K attached to the end of the rope L, and is strained by winding the said rope upon the drum M. When the wire has been drawn sufficiently taut it is secured to the posts by staples or other suitable means, and the next wire is strained and secured in the same way. The clamp K is made like a pair of compasses, with one leg longer than the other. This longer leg has an eye in its end to receive the rope L, and is provided with a ring or link, N, be slipped on and off the end of the short leg to clasp and release the wire. Should a section of wire be accidentally left too slack, or should it break, two clamps, K, are attached to it, one of which is connected with the bend of a U-bar, P, and the other with the end of a flat bar, R. The ends of said U-bar are pivoted to the arms or bars of a slotted lever, S, opposite the center of the slot formed longitudinally in said lever, and which is a little longer than the breadth of the flat bar R, so that said lever may be oscillated upon the said bar. The inner end of the flat bar has alternate notches formed in its edges, and the middle part and outer end have two rows of holes formed in them near their edges, as shown in Fig. 4.

The clamps K are attached to the wires in such position that the lever S may be in the first notch or notches of the bar R. Then, by stepping the lever forward from notch to notch and hole to hole, the wire may be strained to any desired extent, pins *b* being used in the holes of the bar R to serve as fulcrums for the lever S while being stepped forward. When the wire has been sufficiently strained its ends are brought together and twisted by the pliers T′. In using the latter a short hook is bent on the end of each connecting-piece of wire, and the two pieces are thereby hooked together. The hook of one of the pieces of wire is passed through the eye *c* formed upon the outer side of the end of one jaw of the pliers. The main portion of said piece of wire is then clamped by the pliers, and the latter are turned several times around the said main portion of the piece of wire. This causes the hook end of the piece of wire to be securely united to the main portion of the wire. A similar operation is then carried out in reference to the connecting-piece of wire. Its hook being engaged with the eye of the pliers and its main portion being clamped by the jaws of the pliers, the latter are turned so as to securely fasten the hook end and main portion of the wire together.

The inclined grooves *d*, formed in the face of one of the jaws of the pliers, are adapted to prevent the wire from slipping when clamped by the pliers.

Having fully described my invention, what I claim as new, and desire to secure by Letters Patent, is—

1. In a wire-fence builder, the combination, with the horizontally-inclined bars, whose lower extremities are secured to the forward portion of the base-frame and whose upper extremities are secured to the rear uprights, of wire-spools journaled at different elevations in said bars, whereby the machine is adapted to be used for laying fence-wires, substantially as set forth.

2. In a wire-fence builder, the wire-clamp consisting of a long and a short arm connected together, said long arm having an eye in its free end, and further provided with the ring or link which is slipped on or off said short leg, substantially as set forth.

3. In a wire-fence builder, the combination, with the two described wire-clamps and the U-shaped bar, of the notched and perforated bar, the slotted lever, and the pins, substantially as set forth.

4. In a wire-fence builder, the combination, with clamp K, drum M, and intermediate connecting-rope, of hooked bar G, whose shank is provided with pulley H, said hooked bar being adapted to be attached to a fence-post and support the wire at a proper height while being strained, substantially as set forth.

5. In a wire-fence builder, the combination, with wire-straining mechanism formed substantially as described, of the pliers, adapted to twist the wire in joining or splicing the latter, one jaw of said pliers being provided with the eye, and the other jaw being provided with the inclined grooves, substantially as set forth.

WILLIAM A. NEWTON.

Witnesses:
SAML. CASS,
JNO. HARTMAN.